US008230899B2

(12) United States Patent
Minisandram

(10) Patent No.: US 8,230,899 B2
(45) Date of Patent: Jul. 31, 2012

(54) SYSTEMS AND METHODS FOR FORMING AND PROCESSING ALLOY INGOTS

(75) Inventor: Ramesh S. Minisandram, Charlotte, NC (US)

(73) Assignee: ATI Properties, Inc., Albany, OR (US)

( * ) Notice: Subject to any disclaimer, the term of this patent is extended or adjusted under 35 U.S.C. 154(b) by 119 days.

(21) Appl. No.: 12/700,954

(22) Filed: Feb. 5, 2010

(65) Prior Publication Data

US 2011/0195269 A1      Aug. 11, 2011

(51) Int. Cl.
   *B22D 11/00*      (2006.01)
(52) U.S. Cl. .................. 164/461; 164/470; 164/471
(58) Field of Classification Search .......... 164/469–471, 164/506–509, 512–515
See application file for complete search history.

(56) References Cited

U.S. PATENT DOCUMENTS

| | | | |
|---|---|---|---|
| 2,191,478 A * | 2/1940 | Hopkins ................ | 164/515 |
| 3,001,059 A | 9/1961 | Jones | |
| 3,493,713 A | 2/1970 | Johnson | |
| 3,617,685 A | 11/1971 | Brill-Edwards et al. | |
| 4,744,504 A | 5/1988 | Turner | |
| 5,298,095 A * | 3/1994 | Russo et al. ................ | 148/670 |
| 5,348,446 A | 9/1994 | Lee et al. | |
| 5,525,779 A | 6/1996 | Santella et al. | |
| 5,665,180 A | 9/1997 | Seetharaman et al. | |
| 5,788,142 A | 8/1998 | Bigay et al. | |
| 5,951,792 A | 9/1999 | Balbach | |
| 6,120,624 A | 9/2000 | Vogt et al. | |
| 6,154,959 A | 12/2000 | Goodwater et al. | |
| 6,484,790 B1 | 11/2002 | Myers et al. | |
| 6,753,504 B2 | 6/2004 | Keller et al. | |
| 7,000,306 B2 | 2/2006 | Rice et al. | |
| 7,172,820 B2 | 2/2007 | Darolia et al. | |
| 7,288,328 B2 | 10/2007 | Darolia et al. | |
| 7,316,057 B2 | 1/2008 | Seth | |
| 2002/0172587 A1 | 11/2002 | Keller et al. | |
| 2004/0079453 A1 | 4/2004 | Groh et al. | |
| 2004/0105774 A1 | 6/2004 | Del Corso et al. | |
| 2005/0011070 A1 | 1/2005 | Rice et al. | |
| 2005/0061855 A1 | 3/2005 | Rice et al. | |
| 2005/0118453 A1 | 6/2005 | Darolia et al. | |
| 2005/0273994 A1 | 12/2005 | Bergstrom et al. | |
| 2006/0008352 A1 | 1/2006 | Segletes et al. | |

(Continued)

FOREIGN PATENT DOCUMENTS

EP      386515      *   9/1990

(Continued)

OTHER PUBLICATIONS

Donachie et al., Superalloys: A Technical Guide, Melting and Conversion, pp. 56-77, ASM International, 2002.

(Continued)

*Primary Examiner* — Kuang Lin
(74) *Attorney, Agent, or Firm* — K&L Gates LLP; Patrick J. Viccaro; John E. Gosselin, III

(57) ABSTRACT

Processes and methods related to producing, processing, and hot working alloy ingots are disclosed. An alloy ingot is formed including an inner ingot core and an outer layer metallurgically bonded to the inner ingot core. The processes and methods are characterized by a reduction in the incidence of surface cracking of the alloy ingot during hot working.

19 Claims, 10 Drawing Sheets

U.S. PATENT DOCUMENTS

| | | | |
|---|---|---|---|
| 2006/0035102 | A1 | 2/2006 | Darolia et al. |
| 2006/0093752 | A1 | 5/2006 | Darolia et al. |
| 2006/0093850 | A1 | 5/2006 | Darolia et al. |
| 2006/0093851 | A1 | 5/2006 | Darolia et al. |
| 2006/0123946 | A1* | 6/2006 | Forbes Jones ............... 75/10.13 |
| 2006/0239852 | A1 | 10/2006 | Shipton et al. |
| 2008/0292465 | A1* | 11/2008 | Seth .......................... 416/204 A |

FOREIGN PATENT DOCUMENTS

| | | |
|---|---|---|
| EP | 0767028 | 4/1997 |
| EP | 0969114 | 1/2000 |
| EP | 1197570 | 4/2002 |
| GB | 1207675 | 10/1970 |
| GB | 2262540 A | 6/1993 |
| JP | 54-52656 A | 4/1979 |
| JP | 6-63743 A | 3/1994 |
| JP | 11320073 | 11/1999 |
| JP | 2003-239025 A | 8/2003 |
| WO | WO-95/35396 | 12/1995 |
| WO | WO-01/12381 | 2/2001 |

OTHER PUBLICATIONS

Paton et al., ESS LM as a way for heavy ingot manufacturing, LMPC, 2007.

ASTM E2465-06 (2006): Standard Test Method for Analysis of Ni-Base Alloys by X-ray Fluorescence Spectrometry.

ASTM E1019-08 (2008): Standard Test Methods for Determination of Carbon, Sulfur, Nitrogen, and Oxygen in Steel, Iron, Nickel, and Cobalt Alloys by Various Combustion and Fusion Techniques.

Santella, An overview of the welding of $Ni_3Al$ and $Fe_3Al$ alloys, ASME and ASM Materials Conference, Dec. 31, 1996.

Levin et al., Robotic weld overlay coatings for erosion control, Quarterly Technical Progress Report for U.S. DOE Grant No. DE-FG22-92PS92542, Lehigh University, Energy Research Center, Apr. 25, 1995.

Maziasz et al., Overview of the development of FeAl intermetallic alloys, Proceedings of the 2d International Conference on Heat-Resistant Materials, Sep. 1, 1995.

Ito et al., Blast erosion properties of overlay weld metal, Welding International, 5:3, 1991, pp. 192-197.

Horn et al., Auftragschweißungen mit Hastelloy alloy B-42 (Overlay welding with Hastelloy B-42), Materials and Corrosion, 43:8, 1992, pp. 381-387.

Tillack, Weld fabrication of nickel-containing materials, Practical handbook of stainless steels & nickel alloys, Lamb ed., CASTI Publishing Inc., ASM International, Aug. 1999, pp. 325-370.

\* cited by examiner

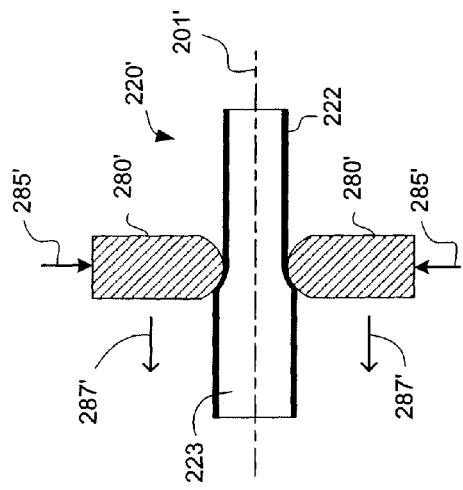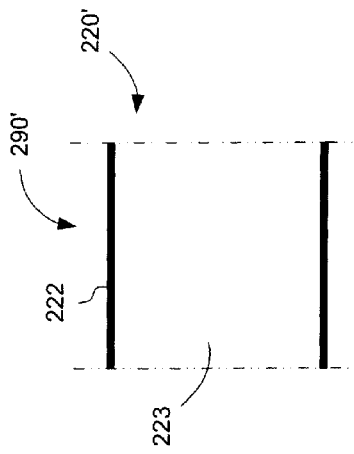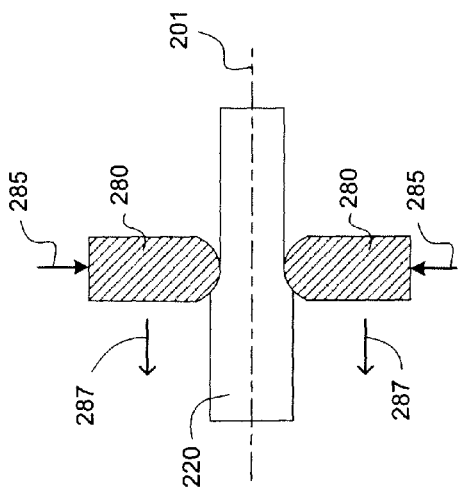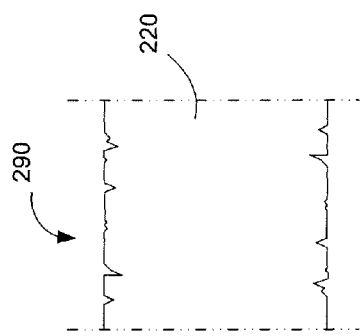
FIG. 5C
FIG. 5D
FIG. 5A
FIG. 5B

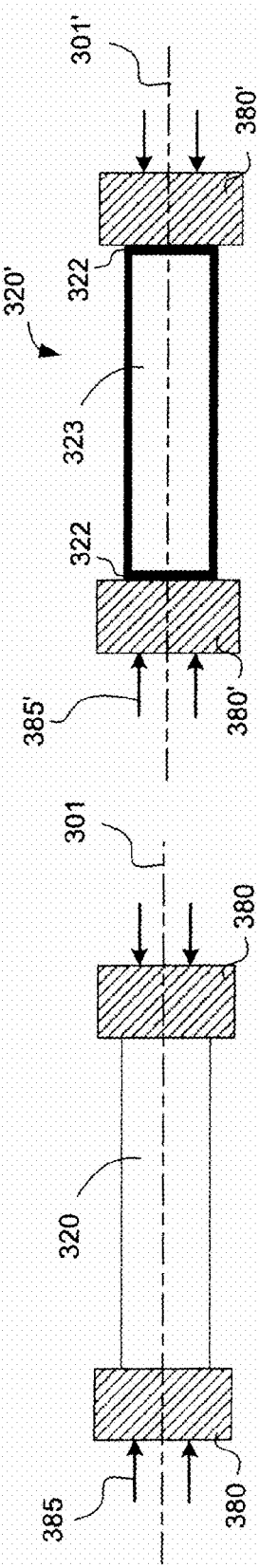
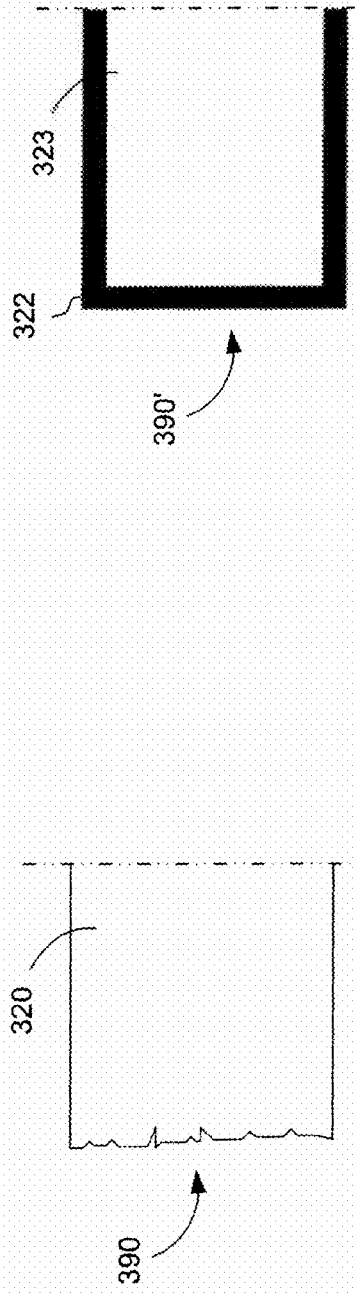

SYSTEMS AND METHODS FOR FORMING AND PROCESSING ALLOY INGOTS

TECHNICAL FIELD

The present disclosure is directed to systems, apparatuses, and processes for forming alloy ingots. The present disclosure is also directed to systems, apparatuses, and methods for processing alloy ingots. The present disclosure is further directed to alloy ingots and other articles formed and processed as described herein.

BACKGROUND

Metal alloy products may be prepared, for example, using ingot metallurgy operations. Ingot metallurgy operations involve the melting of alloy feedstock and the casting of the molten material to form an ingot. A non-limiting example of an ingot metallurgy operation is a "triple melt" technique, which includes three melting operations: (1) vacuum induction melting (VIM) to prepare a desired alloy composition from feedstock; (2) electroslag refining (ESR), which may reduce levels of, for example, oxygen-containing inclusions; and (3) vacuum arc remelting (VAR), which may reduce levels of volatile alloy components and compositional segregation that may occur during solidification after ESR.

The alloy ingots formed from ingot metallurgy operations may be hot worked to produce other alloy products. For example, after solidification to form an alloy ingot, the ingot may undergo forging and/or extrusion to form a billet or other alloy article from the ingot.

SUMMARY

Embodiments disclosed herein are directed to a process for forming an alloy ingot. The process comprises positioning an alloy liner into a crucible for use in a vacuum arc remelting apparatus. An alloy electrode is remelted in the vacuum arc remelting apparatus. The alloy electrode is vacuum arc remelted into the alloy liner in the crucible. In this manner, an alloy ingot is formed comprising an outer layer metallurgically bonded to an inner ingot core.

Other embodiments are directed to a method for processing an alloy ingot. The method comprises applying force to an alloy ingot to deform the alloy ingot. The alloy ingot comprises an outer layer metallurgically bonded to an inner ingot core. The outer layer comprises an alloy that is more ductile than the alloy comprising the inner ingot core. The outer layer reduces an incidence of surface cracking of the alloy ingot during the application of force to the alloy ingot.

It is understood that the invention disclosed and described herein is not limited to the embodiments disclosed in this Summary.

BRIEF DESCRIPTION OF THE DRAWINGS

Various characteristics of the non-limiting embodiments disclosed and described herein may be better understood by reference to the accompanying figures, in which:

FIG. 4A is an end view of the ingot; FIG. 4B is a perspective view of the ingot showing the outer layer partially removed to reveal the underlying surface of the inner ingot core;

FIG. 5A is a schematic diagram illustrating a draw forging operation performed on an alloy ingot; FIG. 5B is a schematic diagram of the cross-section of the ingot illustrated in FIG. 5A after forging; FIG. 5C is a schematic diagram illustrating a draw forging operation performed on an alloy ingot having an outer layer metallurgically bonded to an inner ingot core; FIG. 5D is a schematic diagram of the cross-section of the ingot illustrated in FIG. 5C after forging;

FIG. 6A is a schematic diagram illustrating an upset forging operation performed on an alloy ingot; FIG. 6B is a schematic diagram of the cross-section of the ingot illustrated in FIG. 6A after forging; FIG. 6C is a schematic diagram illustrating an upset forging operation performed on an alloy ingot having an outer layer metallurgically bonded to an inner ingot core; FIG. 6D is a schematic diagram of the cross-section of the ingot illustrated in FIG. 6C after forging;

Figure 1:
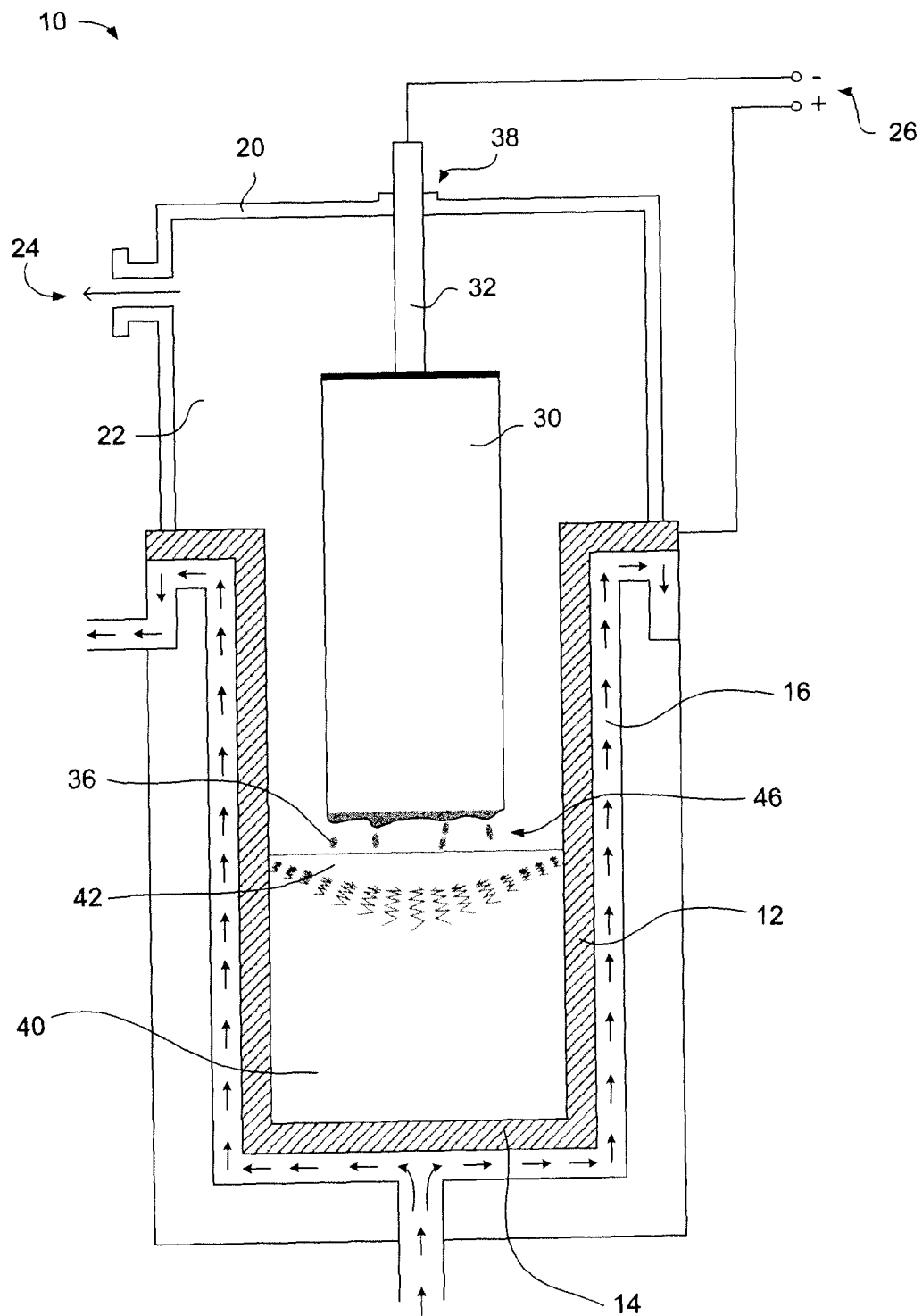
FIG. 1 is a schematic diagram illustrating a vacuum arc remelting (VAR) apparatus.

The reader will appreciate the foregoing details, as well as others, upon considering the following detailed description of various non-limiting embodiments according to the present disclosure. The reader also may comprehend additional details upon implementing or using embodiments described herein.

DETAILED DESCRIPTION OF NON-LIMITING EMBODIMENTS

It is to be understood that various descriptions of the disclosed embodiments have been simplified to illustrate only those features, aspects, characteristics, and the like that are relevant to a clear understanding of the disclosed embodiments, while eliminating, for purposes of clarity, other features, aspects, characteristics, and the like. Persons having ordinary skill in the art, upon considering the present description of the disclosed embodiments, will recognize that other features, aspects, characteristics, and the like may be desirable in a particular implementation or application of the disclosed embodiments. However, because such other features, aspects, characteristics, and the like may be readily ascertained and implemented by persons having ordinary skill in the art upon considering the present description of the disclosed embodiments, and are, therefore, not necessary for a complete understanding of the disclosed embodiments, a description of such features, aspects, characteristics, and the like is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this disclosure. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicant reserves the right to amend the present disclosure to expressly recite any subject matter, or portion thereof, incorporated by reference herein.

The present disclosure includes descriptions of various non-limiting embodiments. It is to be understood that all embodiments described herein are exemplary, illustrative, and non-limiting. Thus, the invention is not limited by the description of the various exemplary, illustrative, and non-limiting embodiments. Rather, the invention is defined solely by the claims, which may be amended to recite any features expressly or inherently described in or otherwise expressly or inherently supported by the present disclosure. Therefore, any such amendments would comply with the requirements of 35 U.S.C. §112, first paragraph, and 35 U.S.C. §132(a).

The various non-limiting embodiments disclosed and described herein can comprise, consist of, or consist essentially of, the features, aspects, characteristics, limitations, and the like, as variously described herein. The various non-limiting embodiments disclosed and described herein can also comprise additional or optional features, aspects, characteristics, limitations, and the like, that are known in the art or that may otherwise be included in various non-limiting embodiments as implemented in practice.

Various alloys may be characterized as crack sensitive. Crack sensitive alloys tend to form cracks during working operations. Crack sensitive alloy ingots, for example, may form cracks during hot working operations used to produce alloy articles from the crack sensitive alloy ingots. For example, alloy billets may be formed from alloy ingots using forge conversion. Other alloy articles may be formed from alloy billets or alloy ingots using extrusion or other working operations. The production yield of alloy articles (e.g., alloy billets) formed from crack sensitive alloy ingots using hot working operations may be low because of the incidence of surface cracking of the alloy ingots during the hot working (e.g., during forging or extrusion). The production yields may be reduced by a need to grind off or otherwise remove the surface cracks from a worked ingot.

As used herein, the term "hot working" refers to the application of force to a workpiece at a temperature greater than ambient temperature, wherein the applied force plastically deforms the workpiece.

During hot working operations, such as, for example, forging or extrusion, a natural temperature gradient forms due to cooling of the alloy ingot surface by heat loss to ambient air. Further, the temperature of an alloy ingot undergoing the working operation may be greater than the temperature of the dies used to mechanically apply force to the surfaces of the ingot. The resulting thermal gradient off-set between the ingot surfaces and the interior portions of the ingot may contribute to surface cracking of the ingot during hot working, particularly for ingots formed from crack sensitive alloys, such as, for example, nickel base, iron base, nickel-iron base, and cobalt base alloys and superalloys.

One way in which to reduce crack formation on the surfaces of alloy ingots during hot working is to place the alloy ingots into an alloy can before hot working. With cylindrical ingots, for example, the inside diameter of the alloy can is slightly larger than the outside diameter of the alloy ingot, thereby allowing the insertion of the ingot into the can. The can loosely surrounds the ingot, providing thermal retention using air gaps and radiation enclosure. During working operations, the dies contact the external can, which at least partially encloses the internal ingot. In this manner, the can may thermally insulate and mechanically protect the surface of the at least partially enclosed ingot, which may reduce the incidence of surface cracking of the ingot during working.

An ingot canning operation may result in various disadvantages. Mechanical contact between the can's outer surfaces and working dies may break the can apart. For example, during upset-and-draw forging of a canned ingot, the can may break apart during a draw operation. In such a case, the ingot may need to be re-canned between each upset-and-draw cycle of a multiple upset-and-draw forging operation, which increases process complexity and expense. Further, the can impairs an operator from visually monitoring the surface of a canned ingot for cracks and other work-induced defects during a working operation.

Embodiments disclosed herein are directed to processes for forming an alloy ingot and to methods for processing an alloy ingot. In various non-limiting embodiments, a process for forming an alloy ingot may comprise positioning an alloy liner into a crucible for use in a vacuum arc remelting (VAR) apparatus. An alloy electrode may be vacuum arc remelted in the vacuum arc remelting apparatus. The alloy electrode may be vacuum arc remelted into the alloy liner in the crucible. In this manner, an alloy ingot may be formed comprising an outer layer metallurgically bonded to an inner ingot core. The outer layer comprises the alloy initially comprising the liner (the liner alloy). The inner ingot core comprises the alloy initially comprising the VAR electrode (the electrode alloy).

Vacuum arc remelting is an ingot metallurgy operation used to improve the cleanliness and refine the structure of alloy ingots. In a VAR operation, the alloy ingot to be remelted may be referred to as an alloy electrode. An alloy electrode to be remelted in a VAR operation may be formed, for example, using air melting (e.g., in an electric arc furnace (EAF)), vacuum melting (e.g., vacuum induction melting (VIM)), electroslag refining (ESR), hearth melt processes, spray forming processes, and/or other melt casting or ingot forming operations. VAR may include the continuous remelting of a consumable alloy electrode by an electrical arc under vacuum. A direct current (DC) power supply may be electrically connected to the alloy electrode and to a base plate of a crucible in a VAR apparatus. The DC power supply strikes an electrical arc between a free end of the alloy electrode and the crucible base plate. The heat generated by the energy discharged through the electrical arc melts the free end of the electrode. VAR is generally described, for example, in Donachie et al., *Superalloys: A Technical Guide*, ASM International, 2002, incorporated by reference herein.

FIG. 1 is a schematic diagram illustrating a non-limiting embodiment of a VAR apparatus 10. The VAR apparatus 10 includes a crucible 12 having a base plate 14. The crucible 12 is water-cooled by water jacket 16. The water jacket 16 includes a water inlet and a water outlet allowing for the flow of water past outer surfaces of the crucible 12. The water flow past the crucible 12 removes heat from the crucible 12, which in turn removes heat from the molten alloy pool 42 within the crucible 12, thereby facilitating solidifying the molten alloy pool 42 into a vacuum arc remelted ingot 40. The vacuum arc remelted ingot 40 is molded by the internal surfaces of the crucible 12. The water flow past the crucible 12 also removes heat from the ingot 40. The crucible 12 mates with a VAR head 20 to form a sealed furnace chamber 22. The VAR head 20 includes a vacuum port 24, which allows a vacuum to be drawn down within the furnace chamber 22.

One end of an alloy electrode 30 is connected to a ram 32 extending into the furnace chamber 22 of the VAR apparatus 10. The ram 32 drives the free end of the electrode 30 into the open volume of the crucible 12. The ram 32 vertically positions the alloy electrode 30 in the crucible 12 as the alloy electrode 30 melts, and the molten alloy 36 falls through electrode arc gap 46 into the molten alloy pool 42 on the upper surface of the ingot 40. In this manner, the ram 32 may be advanced toward the base plate 14 to move the alloy electrode 30 and maintain a relatively constant electrode arc gap 46 within operative tolerances. The ram 32 is movably positioned through a sealed opening 38 in the VAR head 20 so that a vacuum may be maintained in furnace chamber 22 during a VAR operation.

The alloy electrode 30 melts due to heat generated by energy discharged through an electrical arc initially formed between the free end of the electrode 30 and the crucible base plate 14. The electrode 30 and the base plate 14 are electrically connected to a power supply 26. The electrical arc initially forms between the free end of the electrode 30 and the base plate 14 through an electrode arc gap 46. The vertical positioning action of the ram 32 maintains the electrode arc gap 46 and the electrical arc formed between the free end of the electrode 30 and the solidifying ingot 40 after the molten alloy covers the base plate 14 and begins to fill the open volume within the crucible 12.

Figure 2:
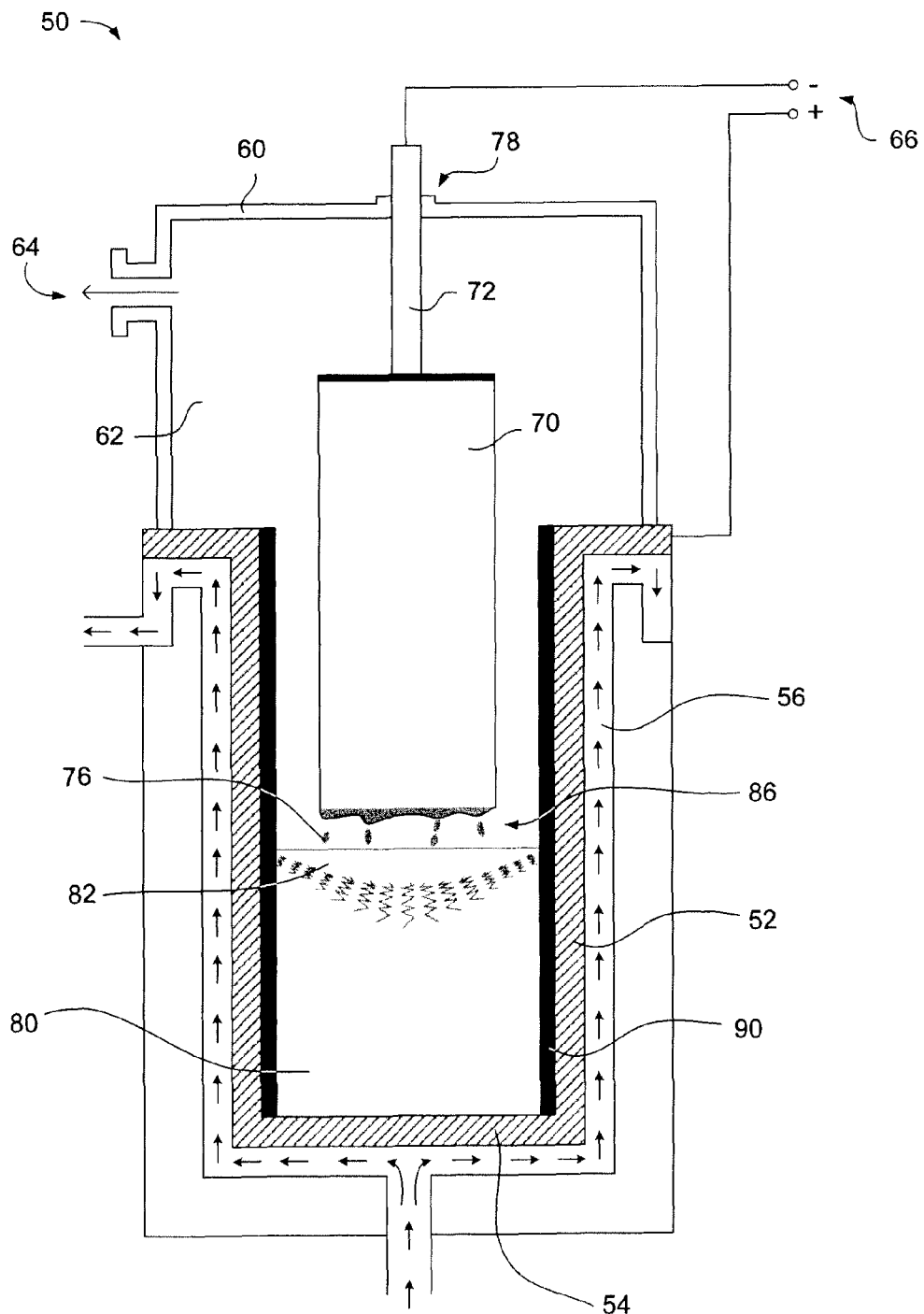
FIG. 2 is a schematic diagram illustrating a VAR apparatus having an alloy liner positioned in the crucible of the apparatus.

FIG. 2 is a schematic diagram illustrating a non-limiting embodiment of a VAR apparatus 50. The VAR apparatus 50 includes a crucible 52 having a base plate 54. An alloy liner 90 is positioned in the crucible 52. Although FIG. 2 shows the alloy liner 90 open at both opposed ends, in various alternate embodiments the alloy liner may be partially or entirely closed at the end positioned adjacent to the base plate of a VAR apparatus. The crucible 52 is water-cooled by water jacket 56. The water jacket 56 includes a water inlet and a water outlet allowing for the flow of water past external surfaces of the crucible 52. The water flow past the crucible 52 removes heat from the crucible 52, which in turn removes heat from the alloy liner 90 and the molten alloy pool 82 within the alloy liner 90, thereby facilitating solidifying the molten alloy pool 82 into a vacuum arc remelted inner ingot core 80. In this manner, an alloy ingot is formed comprising an outer layer metallurgically bonded to an inner ingot core. The outer layer comprises material initially comprising the alloy liner 90, and the inner ingot core comprises material initially comprising an alloy electrode 70. The crucible 52 mates with a VAR head 60 to form a sealed furnace chamber 62. The VAR head 60 includes a vacuum port 64, which allows a vacuum to be drawn down within the furnace chamber 62.

One end of the alloy electrode 70 is connected to a ram 72 in the VAR apparatus 50. The ram 72 drives the free end of the electrode 70 into the open space within the alloy liner 90. The ram 72 vertically positions the alloy electrode 70 in the alloy liner 90 as the alloy electrode 70 melts and the molten alloy 76 drips through electrode arc gap 86 into the molten alloy pool 82. In this manner, the ram 72 may be controlled to maintain a relatively constant electrode arc gap 86 within operative tolerances. The ram 72 is movably positioned through a sealed opening 78 in the VAR head 60 so that a vacuum may be maintained in the furnace chamber 62 during a VAR operation.

The alloy electrode 70 melts due to heat generated by energy discharged through an electrical arc initially formed between the free end of the electrode 70 and the crucible base plate 54. The electrode 70 and the base plate 54 are electrically connected to a power supply 66. The electrical arc initially forms between the free end of the electrode 70 and the base plate 54 through an electrode arc gap. The vertical positioning action of the ram 72 maintains the electrode arc gap 86 and the electrical arc formed between the free end of the electrode 70 and the solidifying ingot 80 after the molten alloy covers the crucible base plate 54 and begins to fill the volume within the alloy liner 90. In this manner, the alloy electrode 70 may be vacuum arc remelted into the alloy liner 90, which is positioned in the crucible 52 in the vacuum arc remelting apparatus 50.

Figure 3:
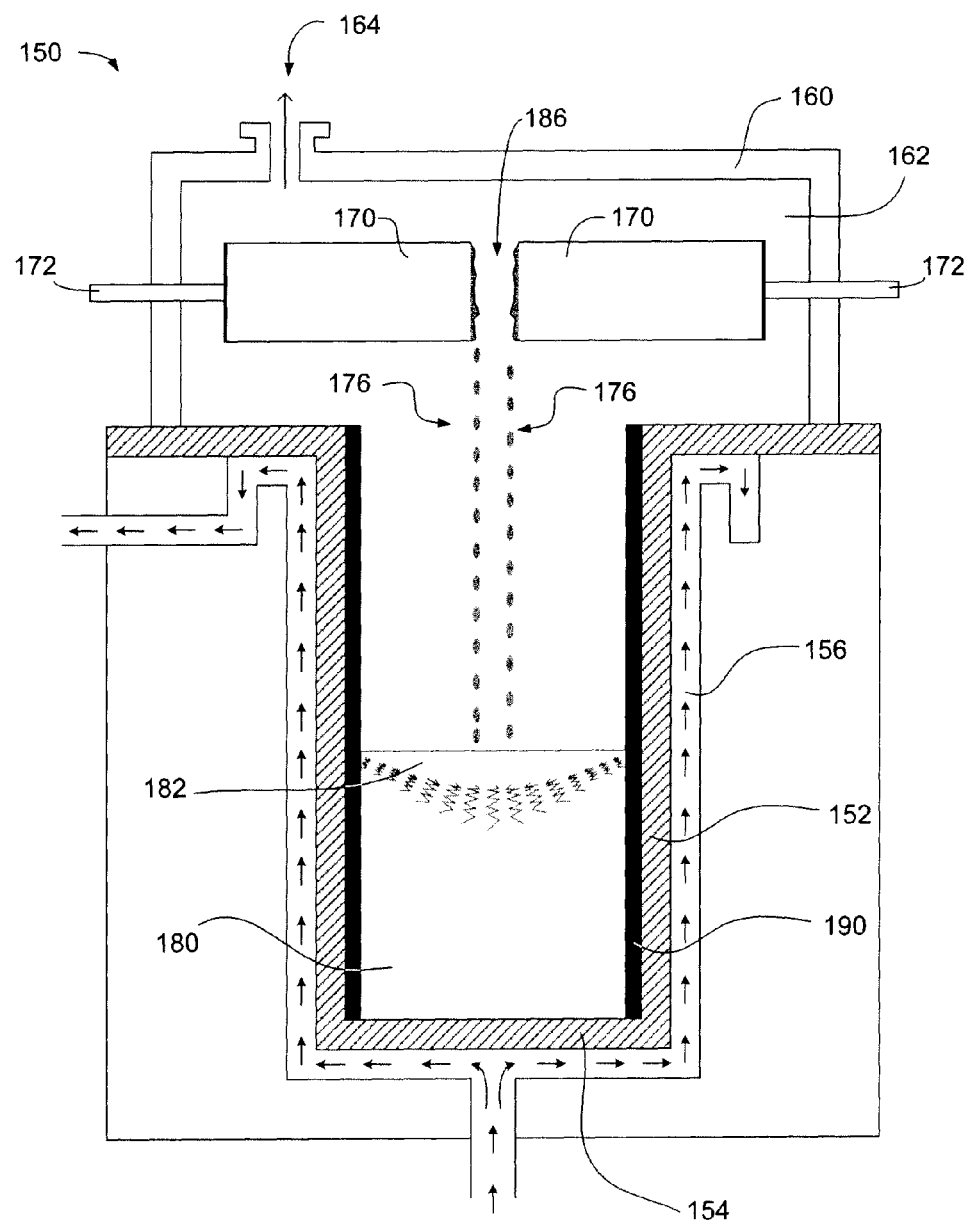
FIG. 3 is a schematic diagram illustrating a vacuum arc double electrode remelting apparatus having and alloy liner positioned in the crucible of the apparatus.

As used herein, the terms "vacuum arc remelting" and "VAR" include variations of VAR, such as, for example, vacuum arc double electrode remelting (VADER). FIG. 3 is a schematic diagram illustrating a non-limiting embodiment of a VAR apparatus 150 comprising a VADER apparatus. The VAR apparatus 150 includes a crucible 152 having a base plate 154. An alloy liner 190 is positioned in the crucible 152. Although FIG. 3 shows the alloy liner 190 as open at both opposed ends, in various alternative embodiments, the alloy liner may be partially or entirely closed at the end positioned adjacent to the base plate of a VAR apparatus. The crucible 152 is water-cooled by water jacket 156. The water jacket 156 includes a water inlet and a water outlet allowing for the flow of water past the external surfaces of the crucible 152. The water flow past the crucible 152 removes heat from the crucible 152, which in turn removes heat from the alloy liner 190 and the molten alloy pool 182 within the alloy liner 190, thereby facilitating solidifying the molten alloy pool 182 into a vacuum arc double electrode remelted inner ingot core 180. In this manner, an alloy ingot is formed comprising an outer layer metallurgically bonded to an inner ingot core. The outer layer comprises material initially comprising the alloy liner 190 and the inner ingot core comprises material initially comprising two alloy electrodes 170. The crucible 152 mates with a VAR head 160 to form a sealed furnace chamber 162. The VAR head 160 includes a vacuum port 164, which allows a vacuum to be drawn down within the furnace chamber 162.

One end of each alloy electrode 170 is connected to a ram 172 in the VAR apparatus 150. The rams 172 drive the free ends of the electrodes 170 toward each other, maintaining an electrode arc gap 186. The rams 172 horizontally position the alloy electrodes 170 with respect to each other as the alloy electrodes 170 melt and the molten alloy 176 drips into the molten alloy pool 182. In this manner, the rams 172 may be controlled to maintain a relatively constant electrode arc gap 186 within operative tolerances.

The alloy electrodes 170 melt due to heat generated by energy discharged through an electrical arc formed between the free ends of each electrode 170. The electrodes 170 are electrically connected to a power supply (not shown). The arc forms between the free ends of the electrodes 170 through the electrode arc gap 186. The horizontal positioning action of the rams 172 maintains the electrode arc gap 186 and the electrical arc formed between the free ends of the electrodes 170. In this manner, the alloy electrodes 170 may be vacuum arc remelted into the alloy liner 190, which is positioned in the crucible 152 in the VAR apparatus 150.

In various non-limiting embodiments, a process for forming an alloy ingot may comprise a vacuum arc remelting process. The vacuum arc remelting process may comprise positioning an alloy liner into a crucible in a vacuum arc remelting apparatus. At least one alloy electrode may be vacuum arc remelted into the alloy liner positioned in the crucible in the vacuum arc remelting apparatus. As molten electrode alloy drip melts from an alloy electrode into the melt pool positioned within the alloy liner, the heat may partially melt the alloy liner in regions adjacent to the melt pool. As the molten electrode alloy and the at least partially melted liner alloy solidify within the crucible, the alloy liner and the solidified electrode alloy fuse and metallurgically bond, thereby forming an alloy ingot comprising an outer layer metallurgically bonded to an inner ingot core. The outer layer of the ingot comprises the liner alloy. The inner ingot core of the ingot comprises the electrode alloy.

Figure 4A:
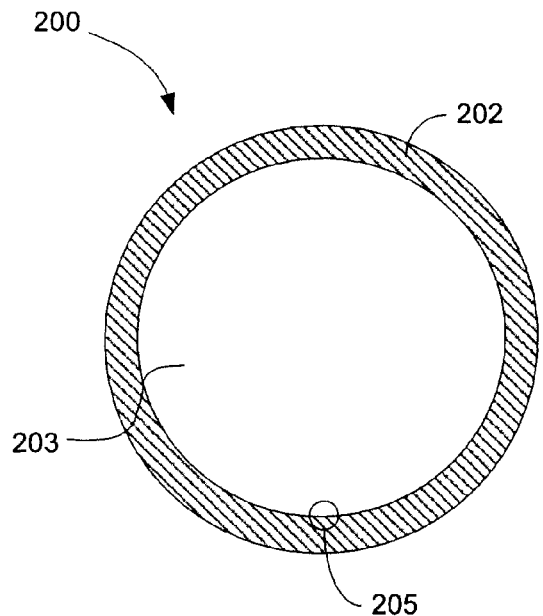
FIGS. 4A and 4B are schematic diagrams of a cylindrical alloy ingot having an outer layer metallurgically bonded to an inner ingot core.
Figure 4B:
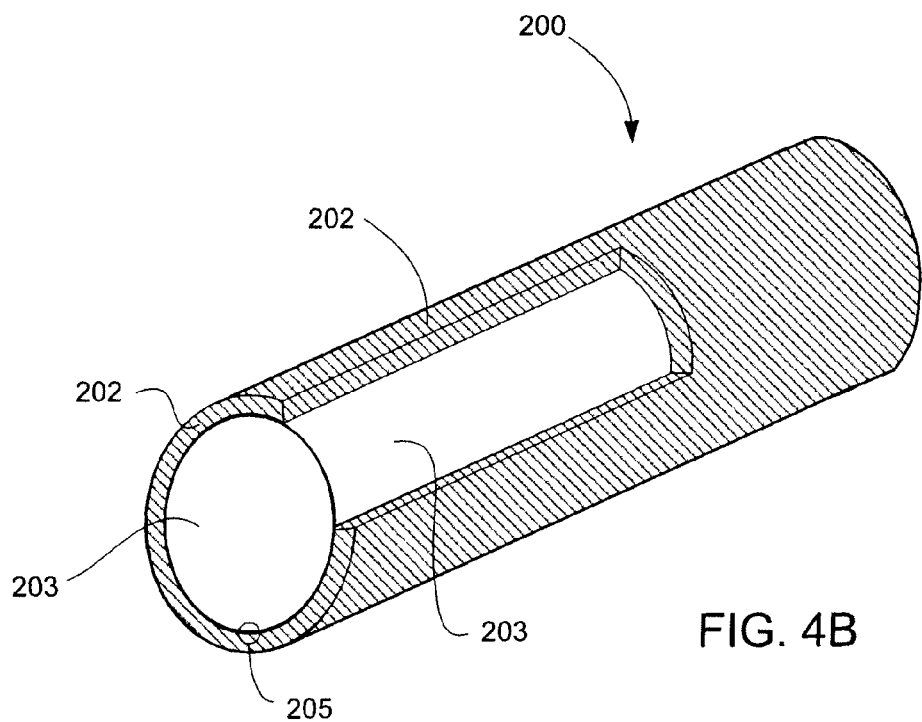

FIGS. 4A and 4B are schematic diagrams of an alloy ingot 200 formed according to various non-limiting embodiments described herein. The alloy ingot 200 comprises an outer layer 202 metallurgically bonded to an inner ingot core 203. The interface 205 between the outer layer 202 and the inner ingot core 203 comprises a metallurgical bond formed between the liner alloy comprising the outer layer 202 and the electrode alloy comprising the inner ingot core 203.

In various non-limiting embodiments, the metallurgical bond may comprise an inter-metallic fusion or coalescence of the liner alloy comprising the outer layer 202 and the electrode alloy comprising the inner ingot core 203. For example, when an alloy electrode is remelted into an alloy liner, the molten electrode alloy may fuse to the internal surface of the alloy liner, thereby forming a metallurgically bonded interface between an outer layer (comprising the liner alloy) and an inner ingot core (comprising the electrode alloy). The heat energy carried by the molten electrode alloy may at least partially melt the internal surface of the alloy liner, which may partially coalesce with the molten electrode alloy, thereby forming a metallurgically bonded interface between the outer layer and the inner ingot core upon solidification.

In various non-limiting embodiments, the metallurgical bond may comprise an alloy gradient region in which the composition of the ingot transitions along a gradient from the electrode alloy composition to the liner alloy composition. The alloy gradient may form due to a blending of the electrode alloy and the liner alloy in the alloy gradient region. When the alloy electrode is melted into the alloy liner, molten electrode alloy may at least partially blend with at least a portion of melted liner alloy, which may at least partially melt due to the heat energy of the molten electrode alloy drip melting into the melt pool within the alloy liner. In this manner, an ingot may be formed comprising an outer layer formed from the liner alloy, an inner ingot core formed from the electrode alloy, and an alloy gradient region formed from a blend of the electrode alloy and the liner alloy, characterized in that the blend transitions from the electrode alloy to the liner alloy within the alloy gradient region.

In various embodiments, the outer layer (comprising the liner alloy) and the inner ingot core (comprising the electrode alloy) are not metallurgically bonded together. For example, if the melting point temperature of the liner alloy is much higher than the melting point temperature of the electrode alloy, then the molten electrode alloy will solidify inside the alloy liner without the alloy liner melting or otherwise fusing to the solidified inner ingot core. In this manner, the alloy liner functions as a mold in which the electrode alloy solidifies into an inner ingot core physically associated with, but not metallurgically bonded to, an outer layer.

The degree of coalescence or blending of the liner alloy and the electrode alloy, and in turn, the volume of the interface region between the outer layer and the inner ingot core in metallurgically bonded embodiments, may be controlled, for example, by selecting respective alloys having specified melting point temperatures. For example, if the melting point temperature of the liner alloy is sufficiently higher than the melting point temperature of the electrode alloy, then the molten electrode alloy will metallurgically fuse to the internal surface of the alloy liner, resulting in a relatively small interface region.

However, if the melting point temperature of the liner alloy is much lower than the melting point temperature of the electrode alloy, then the alloy liner may melt entirely and mix with the molten electrode alloy. This may be undesirable because it could significantly change the chemistry of the inner ingot core of the resulting ingot, which may result in the electrode alloy out being of specification. In various non-limiting embodiments, a liner alloy is selected for a given electrode alloy that results in a strong metallurgical bond between the outer layer and the inner ingot core, but that also does not excessively melt when contacted by the molten electrode alloy. In this manner, the alloy comprising the inner ingot core may remain within specification.

In various non-limiting embodiments, the electrode alloy (which subsequently comprises the inner ingot core) may comprise a crack sensitive alloy. For example, various nickel base, iron base, nickel-iron base, and cobalt base alloys and superalloys may be crack sensitive, especially during hot working operations. An alloy electrode may be formed from such crack sensitive alloys and superalloys. A crack sensitive alloy electrode may be formed from an alloy or superalloy including, but not limited to, Alloy 718, Alloy 720, Rene 41™ alloy, Rene 88™ alloy, Waspaloy® alloy, and Inconel® 100 alloy. The embodiments described herein are generally applicable to any alloy characterized by a relatively low ductility at hot working temperatures. As used herein the term "alloy" includes conventional alloys and superalloys, wherein superalloys exhibit relatively good surface stability, corrosion and oxidation resistance, high strength, and high creep resistance at high temperatures.

The liner alloy (which subsequently comprises the outer layer) may be an alloy that is more ductile and/or malleable than the electrode alloy (and, subsequently, the underlying inner ingot core) at the particular working temperatures to be used. The liner alloy may be an alloy that exhibits greater toughness and/or lesser hardness than the alloy comprising the alloy electrode (and the underlying inner ingot core) at the particular working temperatures to be used when hot working the formed ingot. In various non-limiting embodiments, the outer layer insulates the underlying inner ingot core from exposure to ambient air and/or contact with the surfaces of hot working dies, thereby preventing the underlying inner ingot core from cooling to a temperature at which the electrode alloy comprising the inner ingot core becomes brittle and may more readily crack during hot working.

The liner alloy (and the outer layer) may comprise an alloy that is oxidation resistant. In various non-limiting embodiments, the outer layer does not oxidize to an appreciable extent during hot working or otherwise. The outer layer may comprise an alloy exhibiting a relatively high stiffness (e.g., a relatively low elastic modulus). In various non-limiting embodiments, the outer layer does not thin out substantially during hot working (e.g., where the application of force by one or more dies would cause a relatively low stiffness alloy to thin out on the underlying inner ingot core).

In various non-limiting embodiments, the alloy comprising the alloy liner (and the outer layer) and the alloy comprising the alloy electrode (and the underlying inner ingot core) may comprise the same base metal. For example, if the alloy electrode (and inner ingot core) comprises a nickel base alloy or superalloy (e.g., Alloy 718, Alloy 720, Rene 88™ alloy, or Waspaloy® alloy), then the alloy liner (and the outer layer) may also comprise a nickel base alloy, such as, for example, Alloy 625.

In various non-limiting embodiments, the alloy comprising the alloy liner (and the outer layer) and the alloy comprising the alloy electrode (and the underlying inner ingot core) may comprise a different base metal. For example, if the alloy electrode (and inner ingot core) comprises a nickel base alloy or superalloy (e.g., Alloy 718, Alloy 720, Rene 88™ alloy, or Waspaloy® alloy), then the alloy liner (and the outer layer) may comprise an iron base alloy, such as, for example, Type 304 stainless steel.

The wall thickness of the alloy liner may be selected so that the outer layer may be formed having a thickness sufficient to shield the underlying inner ingot core from the surfaces of contacting dies, thereby preventing the underlying inner ingot core from cooling to a temperature at which an underlying surface may more readily crack during hot working. In this manner, greater hot working temperatures may generally correlate with greater outer layer thicknesses. In various non-limiting embodiments, the alloy liner may have a wall thickness of 0.25 inches to 0.5 inches.

An alloy electrode may be formed using an ingot metallurgy operation or a powder metallurgy operation. For example, in various non-limiting embodiments, an alloy electrode may be formed by VIM. In various non-limiting embodiments, an alloy electrode may be formed by VIM-ESR. In this manner, a triple melting process according to various non-limiting embodiments may comprise VIM-ESR-VAR, characterized in that the VAR operation comprises melting an alloy electrode (or two electrodes in a VADER operation) into an alloy liner positioned in the crucible of a VAR apparatus. In various non-limiting embodiments, a powder metallurgy operation may involve atomization of molten alloy and the collection and consolidation of solidified metallurgical powders into an electrode. A non-limiting example of a powder metallurgy operation includes the steps of: (1) VIM to prepare a desired alloy composition from a feedstock; (2) atomization of molten alloy into molten alloy droplets that solidify into alloy powder; (3) optionally, sieving the alloy powder to reduce inclusions; (4) canning and degassing an amount of the alloy powder; and (5) pressing the alloy powder to consolidate the alloy powder into an alloy electrode.

In various non-limiting embodiments, an end layer may be deposited onto at least one end of an alloy ingot having an outer layer metallurgically bonded to an inner ingot core. For example, after a cylindrical alloy electrode is remelted into a tubular alloy liner to form a cylindrical alloy ingot comprising an outer layer metallurgically bonded to an inner ingot core, the inner ingot core may remain exposed on one or both of the opposed ends of the cylindrical ingot. A layer of an alloy material may be deposited onto at least a portion of the exposed inner ingot core on one or both of the opposed ends of the ingot. In this manner, the inner ingot core of a cylindrical ingot may be enclosed within an outer circumferential layer and one or two end layers on one or both ends of the cylindrical ingot.

In various non-limiting embodiments, an alloy end layer may be deposited and metallurgically bonded to one or both of the opposed ends of an alloy ingot. For example, an alloy end layer may be deposited as a weld deposit onto an end surface of an ingot. A weld deposit may be metallurgically bonded to at least a region of an end surface of an alloy using welding operations including, but not limited to, metal inert gas (MIG) welding, tungsten insert gas (TIG) welding, plasma welding, submerged arc welding, and electron-beam welding.

An alloy end layer may comprise an alloy material that is more ductile and/or malleable than the alloy of the underlying inner ingot core at the particular working temperatures to be used. The alloy end layer may comprise an alloy material that exhibits greater toughness and/or lesser hardness than the alloy of the underlying inner ingot core at the particular working temperature to be used. In various non-limiting embodiments, an alloy end layer insulates the underlying surface of the inner ingot core from the surfaces of contacting dies, thereby preventing the underlying surface from cooling to a temperature at which the surface is brittle and may more readily crack during hot working.

The alloy end layer may comprise an alloy material that is oxidation resistant. In various non-limiting embodiments, the alloy end layer does not oxidize during hot working or otherwise. The alloy end layer may comprise an alloy material exhibiting a relatively high stiffness (e.g., a relatively low elastic modulus). In various non-limiting embodiments, the alloy end layer does not thin out substantially during hot working (e.g., where the application of force by one or more dies would cause a relatively low stiffness metallic material to thin out on the underlying ingot surface).

In various non-limiting embodiments, the alloy material forming an end layer and the alloy forming the underlying inner ingot core may comprise the same base metal. For example, if the inner ingot core comprises a nickel base alloy or superalloy (e.g., Alloy 718, Alloy 720, Rene 88™ alloy, or Waspaloy® alloy), then the alloy material of the end layer may also comprise a nickel base alloy, such as, for example, a nickel base weld alloy (e.g., Techalloy 606™ alloy, available from Techalloy Company/Central Wire). The alloy end layer may be deposited to a thickness sufficient to insulate the underlying surface of the inner ingot core from the surfaces of contacting dies, thereby preventing the underlying surface from cooling to a temperature at which the underlying surface may more readily crack during hot working. In this manner, greater hot working temperatures may generally correlate with greater metallic material layer thicknesses. In various non-limiting embodiments, the metallic material layer may be deposited to a thickness of 0.25 inches to 0.5 inches onto at least a region of a surface of an alloy ingot.

In various non-limiting embodiments, the alloy material forming an end layer metallurgically bonded to an inner ingot core and the alloy material forming an outer circumferential layer metallurgically bonded to the inner ingot core may comprise the same base metal. In various non-limiting embodiments, the alloy material forming an end layer metallurgically bonded to an inner ingot core and the alloy material forming an outer circumferential layer metallurgically bonded to the inner ingot core are the same alloy. In various non-limiting embodiments, the alloy material forming an end layer metallurgically bonded to an inner ingot core and the alloy material forming an outer circumferential layer metallurgically bonded to the inner ingot core are different alloys. In various non-limiting embodiments, the alloy material forming an end layer metallurgically bonded to an inner ingot core and the alloy material forming an outer circumferential layer metallurgically bonded to the inner ingot core comprise different base metals.

After the formation of an ingot comprising an outer layer metallurgically bonded to an inner ingot core (and, optionally, one or two end layers metallurgically bonded to the opposed ends of the inner ingot core), the alloy ingot may be heat treated. For example, in various non-limiting embodiments, an alloy ingot may be exposed to high temperatures to homogenize the alloy composition and microstructure of the inner ingot core. The high temperatures may be above the recrystallization temperature of the alloy comprising the inner ingot core, but below the melting point temperature of the alloys comprising the outer layer and the inner ingot core. In various embodiments, an ingot comprising an outer layer metallurgically bonded to an inner ingot core (and, optionally, one or two end layers metallurgically bonded to the opposed ends of the inner ingot core), will not exhibit any de-bonding of the outer layer (and/or the one or two end layers) from the inner ingot core during or after homogenization or other heat treatments.

Various non-limiting embodiments disclosed herein are also directed to ingot processing methods and hot working processes characterized by a reduction in the incidence of surface cracking of an alloy ingot during a hot working operation. In various non-limiting embodiments, the described methods and processes may comprise forming an alloy ingot having an outer layer metallurgically bonded to an inner ingot core. The outer layer may comprise an alloy that is more ductile than the alloy comprising the inner ingot core. The outer layer may reduce the incidence of surface cracking of the alloy ingot during the application of force to the alloy ingot. In various non-limiting embodiments, an alloy ingot may be hot worked by applying a force to the alloy ingot. The force may be applied to the outer layer of the alloy ingot. The applied force may deform the alloy ingot.

In various non-limiting embodiments, a hot working operation may comprise a forging operation and/or an extrusion operation. For example, an alloy ingot comprising an outer layer metallurgically bonded to an inner ingot core may be upset forged and/or draw forged.

An upset-and-draw forging operation may comprise one or more sequences of an upset forging operation and one or more sequences of a draw forging operation. During an upset operation, the end surfaces of an ingot may be in contact with forging dies that apply force to the ingot that compresses the length of the ingot and increases the cross-section of the ingot. During a draw operation, the side surfaces (e.g., the circumferential surface of a cylindrical ingot) may be in contact with forging dies that apply force to the ingot that compresses the cross-section of the ingot and increases the length of the ingot.

FIGS. 5A and 5C illustrate a draw forging operation. Forging dies 280/280' apply force to an ingot 220/220'. The force is applied generally perpendicular to the long axis 201/201' of the ingot 220/220', as indicated by arrows 285/285'. The forging dies 280/280' apply force to the ingot 220/220' along generally the entire length of the ingot 220/220' by moving generally parallel to the long axis 201/201' of the ingot 220/220', as indicated by arrows 287/287'. FIG. 5A shows an ingot 220 without an outer layer. The circumferential surface of the ingot 220 is in contact with the forging dies 280 (FIG. 5A). FIG. 6C shows an ingot 220' having an outer layer 222 metallurgically bonded to an inner ingot core 223'. The outer layer 222 of the ingot 220' is in contact with the forging dies 280' (FIG. 5C).

FIGS. 5B and 5D illustrate the die-contacting surfaces of the ingots 220 and 220' after draw forging as illustrated in FIGS. 5A and 5C, respectively. As shown in FIG. 5B, the die-contacting surface 290 of the ingot 220 exhibits surface cracking. As shown in FIG. 5D, the die-contacting surface 290' of the ingot 220', which includes the outer layer 222 metallurgically bonded to the inner ingot core 223, does not exhibit surface cracking. The outer layer 222 reduces the incidence of surface cracking in a forged alloy ingot relative to an otherwise identical forged alloy ingot lacking such an outer layer.

FIGS. 6A and 6C illustrate an upset forging operation. Forging dies 380/380' apply force to the opposed ends of an ingot 320/320'. The force is applied generally parallel to the long axis 301/301' of the ingot 320/320', as indicated by arrows 385/385'. FIG. 6A shows an ingot 320 without an outer layer. The ends of the ingot 320 are in contact with the forging dies 380 (FIG. 6A). FIG. 6C shows an ingot 320' including outer layer 322 metallurgically bonded to the inner ingot core 323. The outer layer 322 is metallurgically bonded to a generally cylindrically-shaped inner ingot core 323 along the circumferential surface of the inner ingot core 323. The outer layer 322 is also metallurgically bonded to the opposed ends of the inner ingot core 323. The outer layer 322 is in contact with the forging dies 380' (FIG. 6C).

FIGS. 6B and 6D illustrate a die-contacting surface of each of the ingots 320 and 320' after upset forging as illustrated in FIGS. 6A and 6C, respectively. As shown in FIG. 6B, the die-contacting surface 390 of the ingot 320 exhibits surface cracking. As shown in FIG. 6D, the die-contacting surface 390' of the ingot 320', which includes outer layer 322 metallurgically bonded to the inner ingot core 323, does not exhibit surface cracking. The outer layer 322 reduces the incidence of surface cracking in a forged alloy ingot relative to an otherwise identical forged alloy ingot lacking such an outer layer.

In various non-limiting embodiments, an ingot having an outer layer metallurgically bonded to an inner ingot core may be subjected to one or more upset-and-draw forging operations. For example, in a triple upset-and-draw forging operation, an ingot may be first upset forged and then draw forged. The upset-and-draw sequence may be repeated twice more for a total of three sequential upset-and-draw forging operations. One or more of the die-contacting surfaces of the ingot may have an outer layer that is metallurgically bonded to an inner ingot core.

In various non-limiting embodiments, an ingot having an outer layer that is metallurgically bonded to an inner ingot core may be subjected to one or more extrusion operations. For example, in an extrusion operation, a cylindrical ingot may be forced through a circular die, thereby decreasing the diameter and increasing the length of the ingot. One or more of the die-contacting surfaces of the ingot may have an outer layer that is metallurgically bonded to an inner ingot core.

In various non-limiting embodiments, the methods and processes described herein may be used to produce a wrought billet from an ingot comprising an outer layer that is metallurgically bonded to an inner ingot core. The forge conversion or extrusion conversion of an ingot to a billet or other worked article may produce a finer grain structure in the article as compared to the article prior to the forge or extrusion conversion. The methods and processes described herein may improve the yield of forged or extruded products (such as, for example, billets) from alloy ingots because the outer layer may reduce the incidence of surface cracking of the ingot during the forging and/or extrusion operations. For example, an article including a relatively more ductile alloy outer layer metallurgically bonded to a relatively less ductile alloy inner ingot core may more readily tolerate the strain induced by working dies than an otherwise identical article lacking the relatively more ductile alloy outer layer. An outer layer metallurgically bonded to an inner ingot core may also more readily tolerate the temperature differential between ambient air and the ingot, and/or between the working dies and the ingot, during hot working. In this manner, an outer layer may exhibit zero or minor surface cracking during working of the article, while surface crack initiation is prevented or reduced in the underlying inner ingot core during working.

In various non-limiting embodiments, after hot working, at least a portion of an outer layer may be removed from the product formed from the ingot during the hot working. For example, a grinding, peeling, and/or other turning operation may be used to remove at least a portion of the outer layer. In various non-limiting embodiments, at least a portion of an outer layer may be removed from a billet (formed by working an ingot) by peeling (lathe-turning) and/or grinding the billet and/or using other suitable techniques.

In various non-limiting embodiments, ingots having an outer layer may be hot worked to form products that may be used to fabricate various articles. For example, the processes described herein may be used to form nickel base, iron base, nickel-iron base, or cobalt base alloy or superalloy billets. Billets or other products formed from hot worked ingots may be used to fabricate articles including, but not limited to, turbine components, such as, for example, disks and rings for turbine engines and various land based turbines. Other articles fabricated from ingots processed according to various non-limiting embodiments described herein may include, but are not limited to, valves, engine components, shafts, and fasteners.

The illustrative and non-limiting examples that follow are intended to further describe various non-limiting embodiments without restricting the scope of the embodiments. Persons having ordinary skill in the art will appreciate that variations of the Examples are possible within the scope of the invention as defined solely by the claims. All parts and percents are by weight unless otherwise indicated.

EXAMPLES

Example 1

A cylindrical ingot comprising an outer layer metallurgically bonded to an inner ingot core was formed. A cylindrical alloy liner comprising Alloy 625 nickel base alloy (UNS06625) was formed. Alloy 625 has a nominal chemistry specification as provided in Table 1.

TABLE 1

| Chemistry | C | Mn | Si | S | P | Cr | Ni | Co | Fe | Mo | Ti | Al | Nb + Ta |
|---|---|---|---|---|---|---|---|---|---|---|---|---|---|
| % w/w, min | — | — | — | — | — | 20.0 | Bal. | — | — | 8.0 | — | — | 3.15 |
| % w/w, max | 0.10 | 0.50 | 0.50 | 0.015 | 0.015 | 23.0 | — | 1.0 | 5.0 | 10.0 | 0.40 | 0.40 | 4.15 |

A 6-inch section of Alloy 625 pipe (5.9375-inch OD×4.5945-inch ID) was used to form the alloy liner. The 6-inch section was machined to a 5.625-inch OD to form a wall thickness of about 0.50-0.52 inches. The alloy liner weighed approximately 14.75 lbs.

The alloy liner was positioned inside a copper VAR crucible. The crucible and the alloy liner assembly were positioned inside a VAR apparatus and secured to a crucible base plate. An Alloy 718 nickel base alloy electrode was also positioned inside the VAR apparatus and secured to a ram. Alloy 718 has a nominal chemistry specification as provided in Table 2.

TABLE 2

| Chemistry | C | Mn | Si | S | P | Cr | Ni | Co | Fe | Mo | Ti | Al | B | Nb + Ta |
|---|---|---|---|---|---|---|---|---|---|---|---|---|---|---|
| % w/w, min | — | — | — | — | — | 17.0 | 50.0 | — | Bal. | 2.8 | 0.65 | 0.20 | — | 5.0 |
| % w/w, max | 0.08 | 0.35 | 0.35 | 0.015 | 0.015 | 21.0 | 55.0 | 1.0 | — | 3.3 | 115 | 0.80 | 0.006 | 5.5 |

The Alloy 718 electrode was vacuum arc remelted at 3.5 kilo-amps and 25 volts. The electrical arc was initially struck at approximately 2 kilo-amps, and the arc current quickly rose to 3.5 kilo-amps. During approximately 7 minutes melt time, 30 lbs of the Alloy 718 electrode was melted into the Alloy 625 liner (average melt rate of 4.3 lbs/min).

Figure 7:
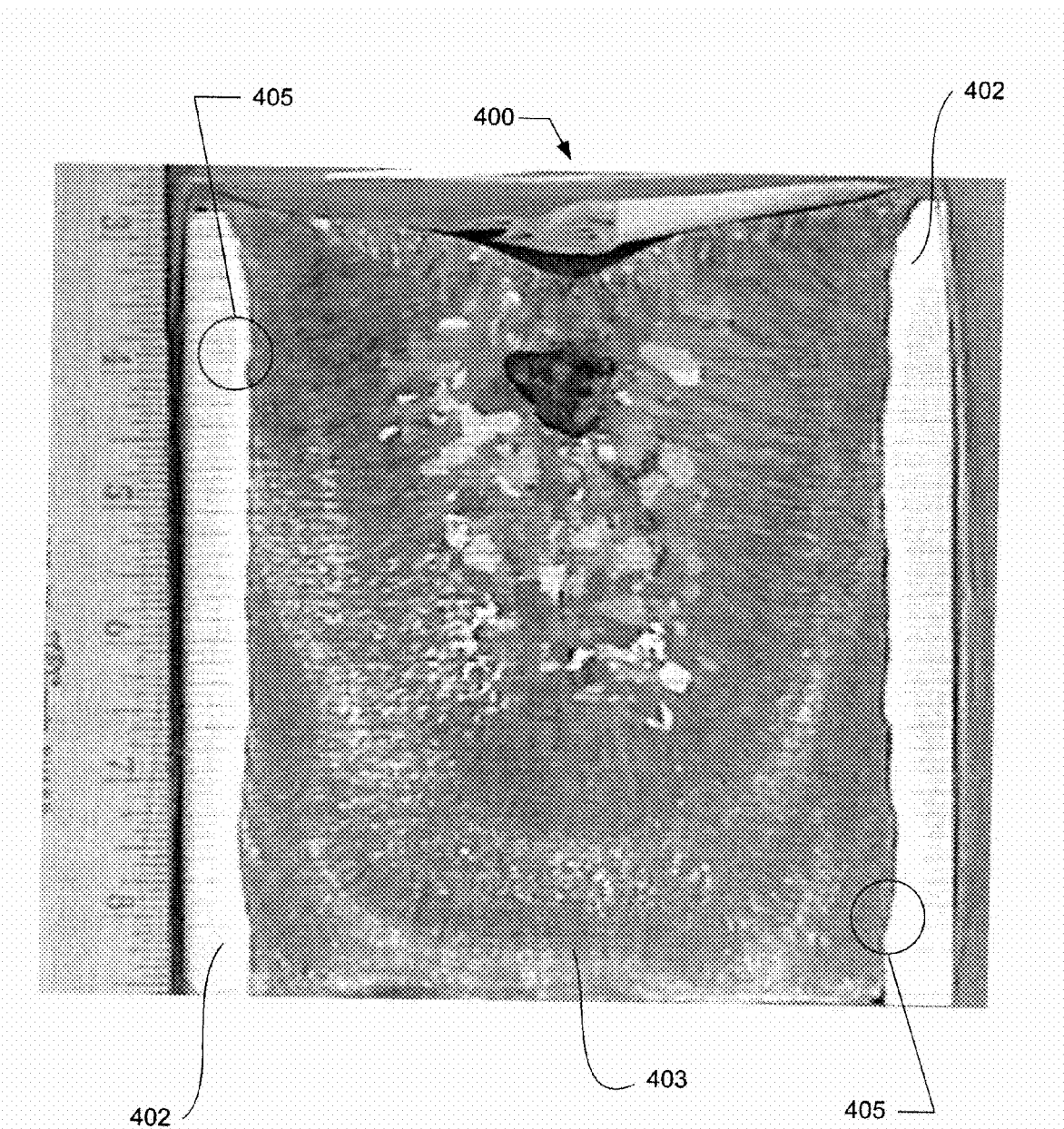
FIG. 7 is a photograph of a macro-etched cross section of an ingot having an outer layer metallurgically bonded to an inner ingot core showing the internal macro-structure of the ingot.

With reference to FIG. 7, the resulting ingot 400 comprised an outer layer 402 metallurgically bonded to an inner ingot core 403. The interface 405 between the outer layer 402 and the inner ingot core 403 comprised a metallurgical bond. The inner ingot core 403 and the outer layer 402 were concentrically disposed. FIG. 7 shows the internal longitudinal cross-section of the ingot after etching with ferric chloride/Canada's etchant. As shown in the photograph of FIG. 7, a strong and uniform metallurgical bond was achieved between the alloy liner (Alloy 625) and the melted electrode alloy (Alloy 718), thereby forming an ingot having an outer layer of Alloy 625 metallurgically bonded to an inner ingot core of Alloy 718.

Example 2

Figure 8A:
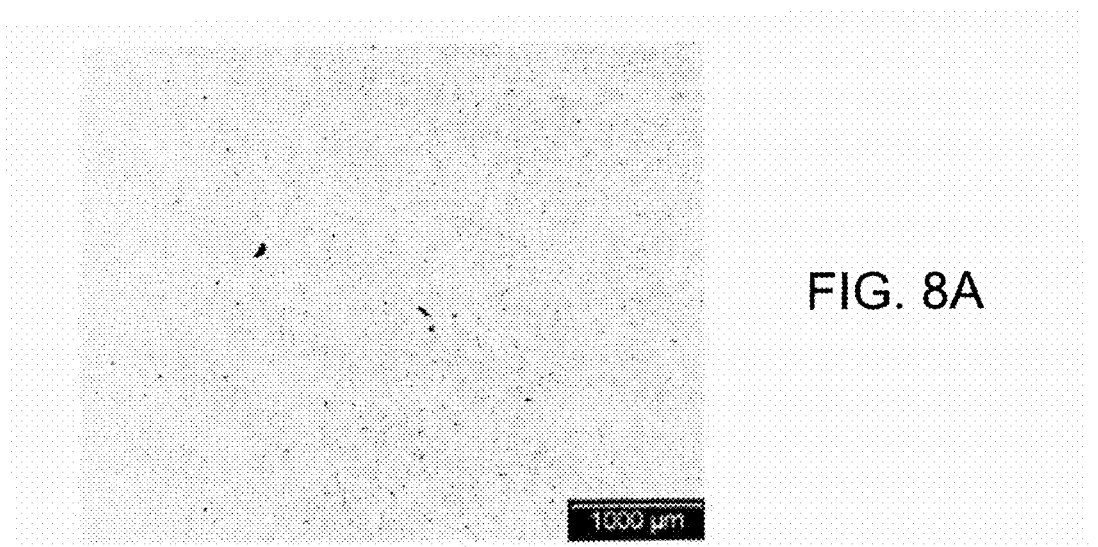
FIG. 8A is an optical micrograph of the outer layer of the ingot shown in FIG. 7.
Figure 8B:
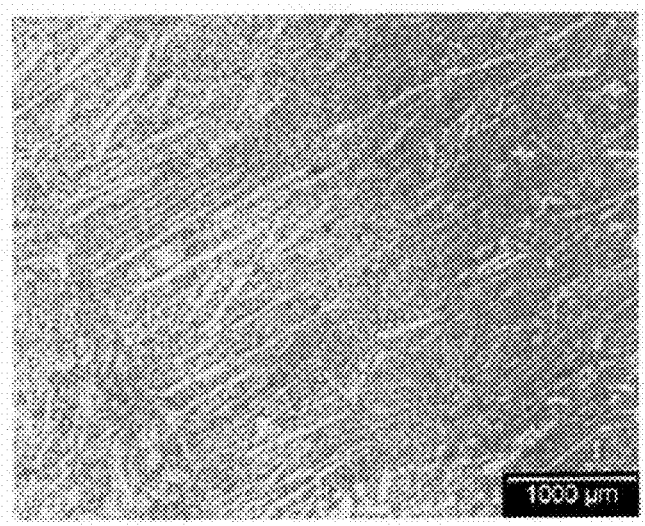
FIG. 8B is an optical micrograph of the inner ingot core of the ingot shown in FIG. 7 taken just inside the interface between the outer layer and the inner ingot core.
Figure 8C:
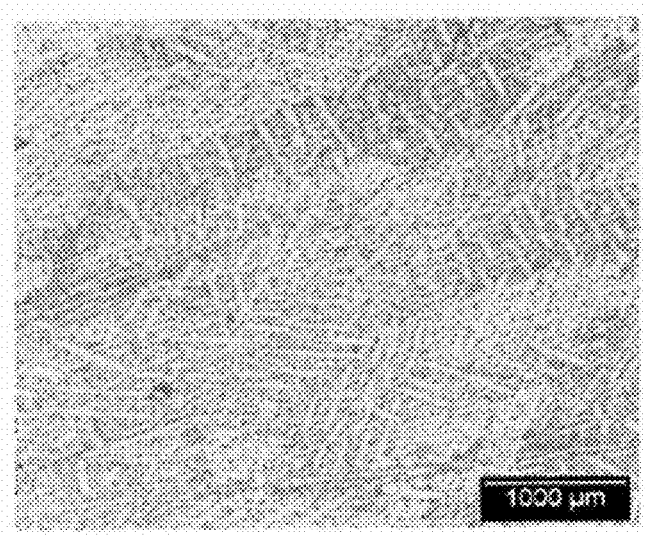
FIG. 8C is an optical micrograph of the inner ingot core of the ingot shown in FIG. 7 taken at a mid-radius location within the ingot.
Figure 8D:
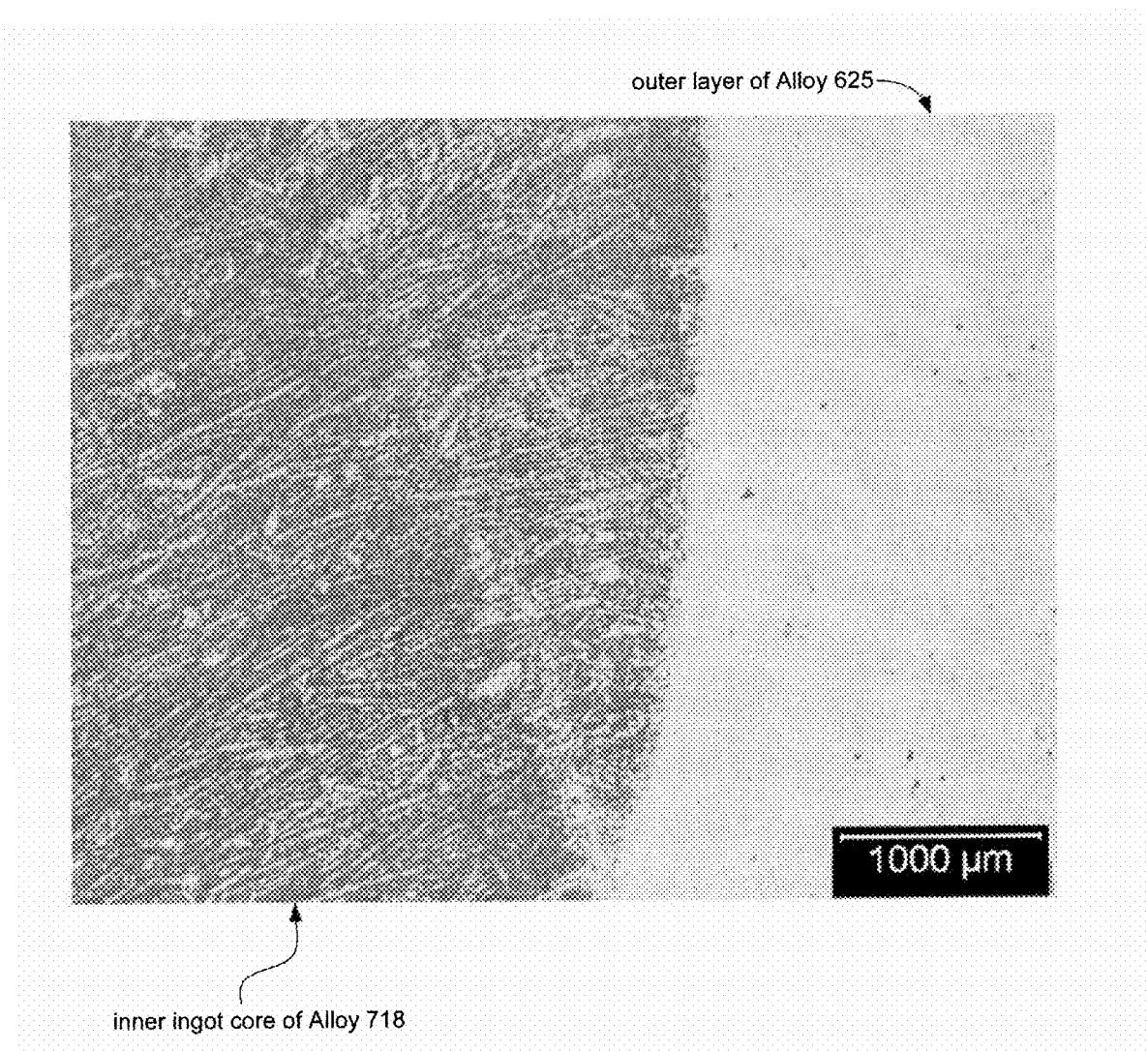
FIG. 8D is an optical micrograph of the interface between the outer layer and the inner ingot core of the ingot shown in FIG. 7.

The microstructure of the ingot formed according to Example 1 was imaged using optical microscopy. FIG. 8A is an optical micrograph of the outer layer of Alloy 625 of the ingot. FIG. 8B is an optical micrograph of the inner ingot core of Alloy 718 of the ingot, just inside the interface between the outer layer and the inner ingot core. FIG. 8C is an optical micrograph of the ingot's inner ingot core of Alloy 718 at a mid-radius location within the inner ingot core. FIG. 8D is an optical micrograph of the interface between the ingot's outer layer and the inner ingot core. As shown in FIG. 8D, a strong and uniform metallurgical bond was formed between the outer layer of the ingot and the inner ingot core.

Example 3

Figure 9:
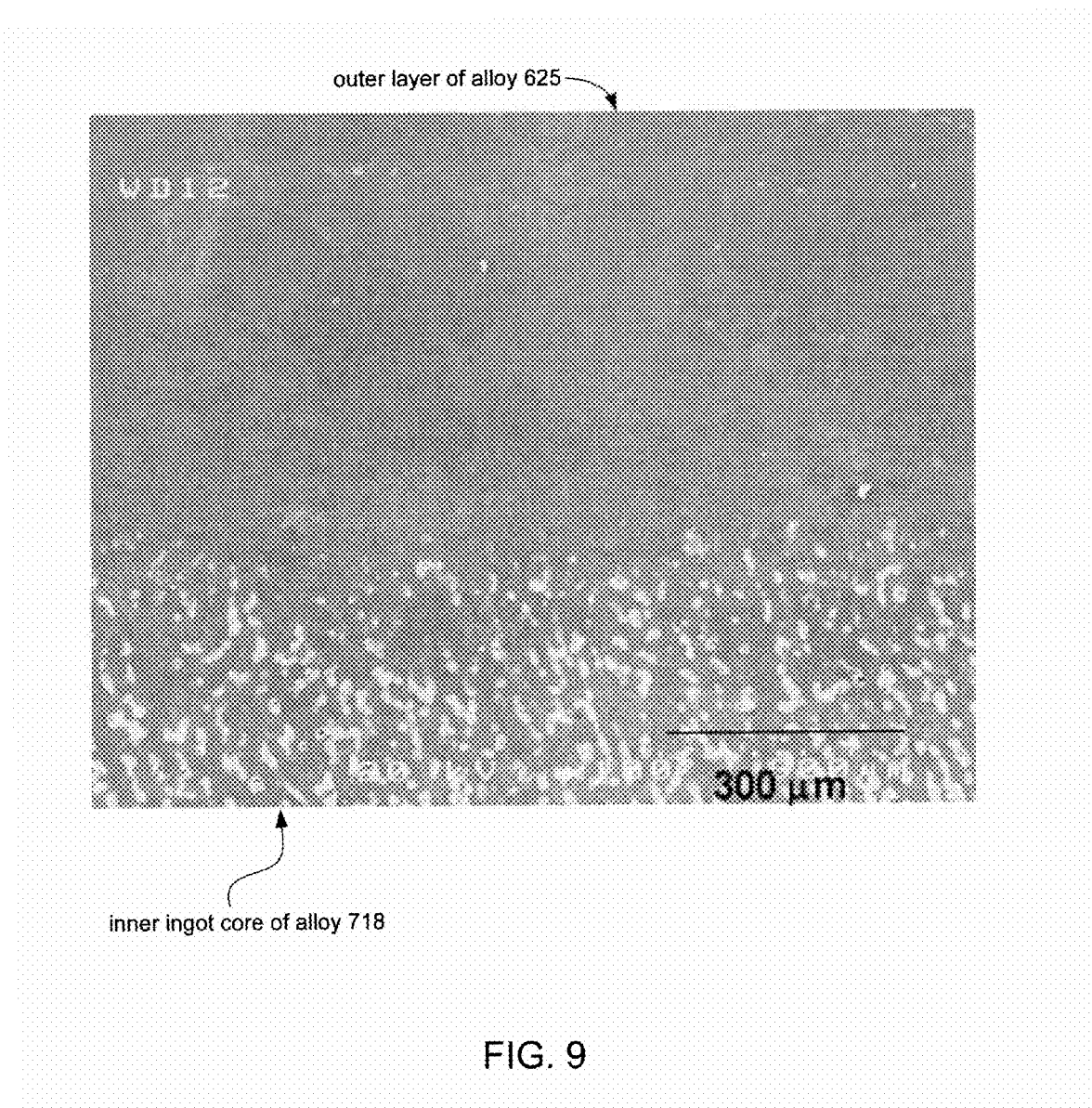
FIG. 9 is an SEM micrograph of the interface between the outer layer and the inner ingot core of the ingot shown in FIGS. 7 and 8A-8D.

The chemistry of the ingot formed according to Example 1 was quantitatively analyzed using Scanning Electron Microscopy/Energy-Dispersive Spectroscopy (SEM/EDS). FIG. 9 is an SEM micrograph of the interface between the ingot's outer layer of Alloy 625 and the ingot's inner ingot core of Alloy 718. As shown in FIG. 9, a strong and uniform metallurgical bond was formed between the outer layer of the ingot and the inner ingot core.

The chemical compositions of the ingot's outer layer of Alloy 625, inner ingot core of Alloy 718, and metallurgically bonded interface region between the outer layer and the inner ingot core determined using SEM/EDS are presented in Table 3. The SEM/EDS measurements for the outer layer and the inner ingot core were taken a few micrometers outwardly and inwardly from the interface region, respectively.

TABLE 3

| Element | outer layer of Alloy 625 (% w/w) | interface region (% w/w) | inner ingot core of Alloy 718 (% w/w) |
|---|---|---|---|
| Al | 0.18 | 0.24 | 0.42 |
| Si | 0.00 | 0.04 | 0.10 |
| Ti | 0.40 | 0.25 | 0.84 |
| Cr | 21.59 | 21.92 | 19.21 |
| Fe | 3.06 | 3.60 | 15.99 |
| Ni | 63.35 | 62.98 | 55.54 |
| Nb | 3.28 | 3.30 | 4.26 |
| Mo | 8.15 | 7.67 | 3.64 |
| Total | 100.01 | 100.00 | 100.00 |

The chemical composition of the outer layer of Alloy 625 was within specifications for the alloy grade for all constituent elements (Table 1). The chemical composition of the inner ingot core of Alloy 718 was within specifications for the alloy grade for all constituent elements except for nickel, niobium, and molybdenum (Table 2). The chemical composition of the interface region was generally intermediate the chemical composition of the Alloy 625 outer layer and the composition of the Alloy 718 inner ingot core, apart from being relatively lean in titanium and relatively rich in chromium.

The chemical composition of the inner ingot core of Alloy 718 was measure twice more using SEM/EDS at approximately one half-inch and one inch inward from the interface region. The results are presented in Table 4.

TABLE 4

| Element | Initial measurement (Table 3) (% w/w) | Measurement at half-inch from interface (% w/w) | Measurement at one-inch from interface (% w/w) |
|---|---|---|---|
| Al | 0.42 | 0.42 | 0.44 |
| Si | 0.10 | 0.14 | 0.15 |
| Ti | 0.84 | 1.18 | 1.03 |
| Cr | 19.21 | 18.53 | 18.40 |
| Fe | 15.99 | 17.65 | 17.08 |
| Ni | 55.54 | 53.38 | 54.66 |
| Nb | 4.26 | 5.30 | 5.03 |
| Mo | 3.64 | 3.20 | 3.20 |
| Total | 100.00 | 99.80 | 99.99 |

The chemical compositions measured for the inner ingot core of Alloy 718 were within specifications for the alloy grade for all constituent elements except for the titanium level measured at one half-inch from the interface region.

Example 4

The chemistry of the inner ingot core of the ingot formed according to Example 1 was quantitatively analyzed using X-ray fluorescence (XRF) spectrometry, combustion and fusion techniques, and spark optical emission spectroscopy (OES). The XRF spectrometry analyses were conducted according to ASTM E2465-06: Standard Test Method for Analysis of Ni-Base Alloys by X-ray Fluorescence Spectrometry, incorporated by reference herein. The combustion and fusion techniques were conducted according to ASTM E1019-08: Standard Test Methods for Determination of Carbon, Sulfur, Nitrogen, and Oxygen in Steel, Iron, Nickel, and Cobalt Alloys by Various Combustion and Fusion Techniques, incorporated by reference herein.

The chemistry of the Alloy 718 electrode was also quantitatively analyzed using XRF spectrometry, combustion and fusion techniques, and spark OES. The measured chemical compositions are presented in Table 5.

TABLE 5

| Element | Electrode (% w/w) | Inner ingot core (% w/w) | Difference (% w/w) | Percent difference relative to electrode |
|---|---|---|---|---|
| Al | 54.010 | 53.774 | −0.236 | −0.4 |
| Si | 18.222 | 17.432 | −0.790 | −4.3 |
| Ti | 18.029 | 17.960 | −0.069 | −0.4 |
| Cr | 2.918 | 3.083 | 0.165 | 5.7 |
| Fe | 0.034 | 0.033 | −0.001 | −2.9 |
| Ni | 0.179 | 0.175 | −0.004 | −2.2 |
| Nb | 0.065 | 0.071 | 0.006 | 9.2 |
| Mo | 5.164 | 5.263 | 0.099 | 1.9 |
| Cu | 0.505 | 0.480 | −0.025 | −5.0 |
| Co | 0.079 | 0.088 | 0.009 | 11.4 |
| Mn | 1.001 | 0.989 | −0.012 | −1.2 |
| C | 0.026 | 0.024 | −0.002 | −7.7 |
| Total | 100.232 | 99.372 | — | — |

The chemical compositions measured for the inner ingot core of Alloy 718 and the initial Alloy 718 electrode were within specifications for the alloy grade for all constituent elements. Further, no appreciable change in the bulk chemistry of the Alloy 718 material was observed after the alloy electrode was remelted into the alloy liner to form an ingot comprising an outer layer metallurgically bonded to an inner ingot core. This demonstrates little or no infiltration/dilution of the electrode chemistry by the alloy liner material. Therefore, the outer layer may be readily removed to form an in-specification Alloy 718 ingot. Alternatively, the ingot may be hot worked, for example, forged down to form a billet and the outer layer may be readily removed to form an in-specification forged Alloy 718 billet exhibiting a reduced incidence of surface cracking.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, characteristics, limitations, and the like, of the embodiments described herein. Thus, this disclosure is not limited by the description of the various exemplary, illustrative, and non-limiting embodiments, but rather solely by the claims. In this manner, Applicants reserve the right to amend the claims during prosecution to add features as variously described herein.

What is claimed is:

1. A process for forming an alloy ingot comprising:
   positioning an alloy liner in a crucible of a vacuum arc remelting apparatus; and
   vacuum arc remelting an alloy electrode into the alloy liner in the crucible, thereby forming an alloy ingot comprising an outer layer metallurgically bonded to an inner ingot core; and
   depositing and metallurgically bonding an end layer on to at least one end of the alloy ingot comprising the outer layer metallurgically bonded to the inner ingot core.

2. The process of claim 1, wherein the alloy liner comprises an alloy that is more ductile than the alloy comprising the alloy electrode.

3. The process of claim 1, wherein the alloy electrode comprises an alloy selected from the group consisting of a nickel base alloy, an iron base alloy, a nickel-iron base alloy, and a cobalt base alloy.

4. The process of claim 1, wherein the alloy electrode comprises an alloy comprising, in weight percent, 0 to 0.08 carbon, 0 to 0.35 manganese, 0 to 0.35 silicon, 0 to 0.015 sulfur, 0 to 0.015 phosphorus, 17.0 to 21.0 chromium, 50.0 to 55.0 nickel, 0 to 1.0 cobalt, 2.8 to 3.3 molybdenum, 0.65 to 1.15 titanium, 0.20 to 0.80 aluminum, 0 to 0.006 boron, 5.0 to 5.5 niobium and/or tantalum, balance iron and incidental impurities.

5. The process of claim 1, wherein the alloy liner comprises a nickel base alloy.

6. The process of claim 1, further comprising:
   hot working the alloy ingot, wherein the hot working comprises applying force onto the outer layer, and wherein the force plastically deforms the alloy ingot.

7. The process of claim 6, wherein hot working the alloy ingot comprises upset-and-draw forging the alloy ingot.

8. The process of claim 6, further comprising removing at least a portion of the outer layer from the alloy ingot after hot working the alloy ingot.

9. The process of claim 6, wherein the process improves the yield of forged nickel-base superalloy products formed from nickel-base superalloy ingots.

10. The process of claim 6, wherein the process produces a wrought nickel-base superalloy billet from a cast nickel-base superalloy ingot.

11. The process of claim 1, further comprising providing the alloy electrode using a vacuum induction melting operation.

12. The process of claim 1, further comprising providing the alloy electrode using a vacuum induction melting-electroslag, refining operation.

13. The process of claim 1, wherein the alloy liner comprises a nickel base alloy comprising, in weight percent, 0 to 0.10 carbon, 0 to 0.50 manganese, 0 to 0.50 silicon, 0 to 0.015 sulfur, 0 to 0.015 phosphorus, 20.0 to 22.0 chromium, 0 to 1.0 cobalt, 0 to 5.0 iron, 8.0 to 10.0 molybdenum, 0 to 0.40 titanium, 0 to 0.40 aluminum, 3.15 to 4.15 niobium and/or tantalum, balance nickel and incidental impurities.

14. The process of claim 1, wherein the vacuum arc remelting comprises vacuum arc double electrode remelting.

15. The process of claim 1, wherein a metallurgical bond between the outer layer and the inner ingot core comprises an alloy gradient region in which the composition of the ingot transitions along a gradient from an electrode alloy composition to a liner alloy composition.

16. The process of claim 1, wherein the alloy liner has a wall thickness in the range of 0.25 inches to 0.5 inches.

17. The process of claim 1, comprising depositing and metallurgically bonding end layers on to opposed ends of the alloy ingot comprising an outer layer metallurgically bonded to an inner ingot core, wherein the inner ingot core is enclosed within an outer circumferential layer and two end layers.

18. The process of claim 1, wherein the end layer comprises a weld deposit.

19. A process for forming an alloy ingot comprising:
   vacuum induction melting a nickel-base alloy to form an alloy electrode;
   electroslag refining the alloy electrode to form a refined alloy electrode;
   vacuum arc remelting the refined alloy electrode into an alloy liner positioned in a crucible of a vacuum arc remelting apparatus, thereby forming an alloy ingot comprising an outer layer metallurgically bonded to an inner ingot core; and
   weld depositing and metallurgically bonding end layers on to opposed ends of the alloy ingot comprising the outer layer metallurgically bonded to the inner ingot core;
   wherein the inner ingot core is enclosed within an outer circumferential layer and two end layers; and
   wherein the outer layer comprises a nickel-base alloy that this more ductile than the nickel-base alloy comprising the inner ingot core.

* * * * *